United States Patent [19]

Stevens

[11] 3,846,559

[45] Nov. 5, 1974

[54] METHOD FOR CONVERTING ANIMAL WASTE PRODUCTS INTO A FOOD SUPPLEMENT

[75] Inventor: Roger H. Stevens, Streator, Ill.

[73] Assignee: International Farm Systems, Inc., Streator, Ill.

[22] Filed: Nov. 30, 1971

[21] Appl. No.: 203,249

Related U.S. Application Data

[63] Continuation-in-part of Ser. Nos. 879,194, Nov. 26, 1969, Pat. No. 3,633,547, and Ser. No. 100,587, Dec. 22, 1970.

[52] U.S. Cl.......................... 426/2, 426/56, 426/59
[51] Int. Cl................................................ A23k 1/00
[58] Field of Search ......... 99/2, 2 R; 195/82; 210/2, 210/11, 12, 15, 18; 426/2, 56, 59

[56] References Cited
UNITED STATES PATENTS

| | | | |
|---|---|---|---|
| 3,337,448 | 8/1967 | Rich | 210/11 |
| 3,375,116 | 3/1968 | Anthony | 426/2 |
| 3,503,751 | 3/1970 | Durham | 426/2 |
| 3,546,812 | 12/1970 | Kobayashi et al. | 210/11 |
| 3,580,840 | 5/1971 | Uridil | 195/115 |

FOREIGN PATENTS OR APPLICATIONS 558,668  6/1958  Canada.................................. 99/9

*Primary Examiner*—Raymond N. Jones

[57] ABSTRACT

An animal feeding process wherein animal waste products are collected and fed to a storage vat and combined with a small quantity of a yeast culture and the combination of these produucts are aerated and agitated preferably under an elevated temperature and acidic conditions. The waste products are converted into a high protein animal feed supplement. The supplement is then subjected to an elevated temperature to inactivate enteric flora. The final product is then added to the animal's feed, i.e., ground corn, soybean meal and the like. The heat treatment reduces the possibility of any disease-producing organisms from being fed to the animal, and improves the digestibility of the product.

6 Claims, 3 Drawing Figures

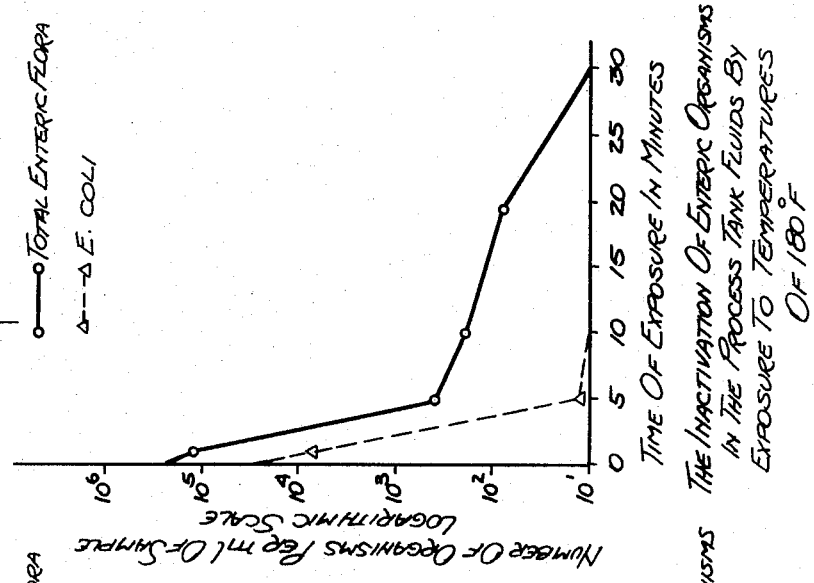
Fig. 3. The Inactivation Of Enteric Organisms In The Process Tank Fluids By Exposure To Temperatures Of 180°F
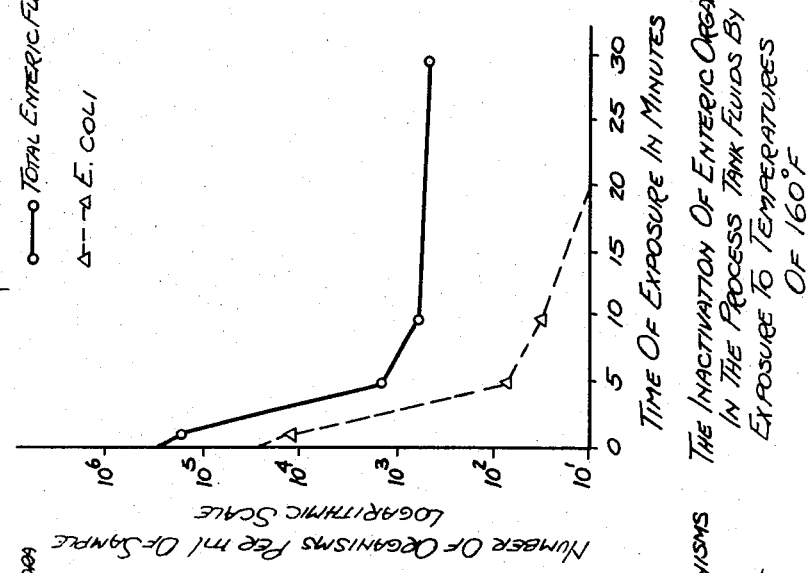
Fig. 2. The Inactivation Of Enteric Organisms In The Process Tank Fluids By Exposure To Temperatures Of 160°F
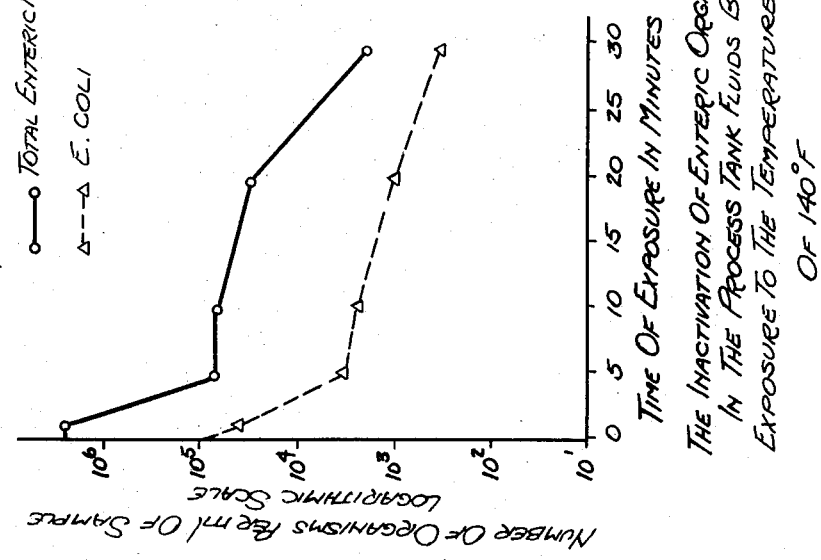
Fig. 1. The Inactivation Of Enteric Organisms In The Process Tank Fluids By Exposure To The Temperatures Of 140°F

METHOD FOR CONVERTING ANIMAL WASTE PRODUCTS INTO A FOOD SUPPLEMENT

CROSS REFERENCES

This application is a continuation-in-part of Patent Applications Ser. No. 879,194, filed Nov. 26, 1969, by Stevens & Blair, now U.S. Pat. No. 3,633,547 and Ser. No. 100,587, filed Dec. 22, 1970, by Stevens.

DESCRIPTION OF THE INVENTION

The present invention relates to a method for converting animal waste products into a nutritious high protein feed supplement.

The present invention provides a beneficial solution to several critical problems in the raising of animals such as swine for human consumption. The first problem is the problem created by disposal of the animal waste to preclude and effectively minimize the chance of pollution of the water supply by the animals' sewage. The dimensions of animal pollution at present have been lost to most ecologists in view of the present furor over industrial pollution. However, in a study undertaken by the American Society of Agricultural Engineers, the conclusion was reached that the sewage production of animals in the United States may be equivalent to the sewage which would be produced by 1 billion humans. There are, for example, approximately 100 million swine raised in the United States each year with each producing sewage daily equivalent to two and one-half to three humans. There are also approximately 50 million cattle with each producing sewage equivalent to ten to 14 humans daily. Such waste creates no problem if they are spread evenly over the land. However, the present trend in animal production is tending more and more toward confined systems wherein animals are grown and fattened within a confined environment until ready for slaughter. In those confined feeding arrangements, the animals are enclosed in a minimum space usually on concrete floors. Feed must be hauled in and the waste products must be disposed of by hauling them away or by disposition in a sewage disposal system. It is the disposal of these waste products which creates one of the most serious restraints on mass production of animals in a confined environment.

There are many techniques presently in use to dispose of animal waste products, most of which create some form of water pollution. Wastes are allowed to run from feed lots situated on hillsides or simply washed away by rain. Some farmers build large artificial ponds or pools or use natural ponds and dispose of the animal waste products by putting the waste products into these ponds. This practice creates large odorous pools which attract flies and mosquitos. Some farmers have even built feed lots near open mine shafts so that the residues could be pumped directly into the earth. These methods of waste disposal create a pollution which eventually seeps into the water supply. In other cases, many farmers still continue to haul the collected waste back to the land as was done before confined feeding systems. However, if even one-third of the confined animal producers discarded the sewage rather than hauling it back to the land, the raw sewage introduced into the water supply would still be enormous.

At present, about 30 to 40 percent of the swine produced in this country are raised in confined systems and the conversion to confined systems for swine production is accelerating. Ten years ago there were few if any totally confined swine producing operations but the number of such swine producing operations is continuously growing. With the continued rate of growth of confined swine producing systems in a very few short years the accumulative effect of the waste disposal from 100 million or more swine produced annually will create a pollution problem of significant magnitude.

This problem is even more accentuated when it is considered that up until recent years most of the agricultural wastes were cycled back to the land in the form of fertilizer to help enrich the yield of the land. But the growing economic urge to produce livestock near the big markets is changing this traditional cycle. Now, most poultry and a growing proportion of swine spend all or much of their lives in the confines of a feed lot or poultry house, often on the outskirts of a large city. Because of the transportation and labor costs involved in the collecting, drying and processing of manure into a useful fertilizer form, farmers now prefer the cheap concentrated and easy to apply artificial fertilizers. The result is that the outskirts of a number of large cities are marked by growing piles of manure with attendant flies, drainage problems and an ever increasing air and water pollution hazard. Because the present invention provides a convenient and economical method to dispose of all the waste products of animals produced in a confined system, this problem of the polluting effect of animal waste products is eliminated.

A second beneficial adjunct to the method of the present invention is an increased economic yield in the growing of swine in a confined environment. Recycling of all of the animal's waste products, besides eliminating undesirable air and water pollution effects, also increases the economic efficiency of swine production. Feed costs for swine represent about 70 percent to 75 percent of the expense of raising swine. Swine rations are predominately composed of corn for energy and soybean meal for protein supplement. Soybean meal represents about 11 percent to 22 percent of the swine feed ration by weight, depending upon the age and weight of the animal, and represents 20 percent to 36 percent of the total feed cost. Thus, with the process of the present invention, the recycled waste products after conversion to a protein rich product, are added to the normal swine feed ration in place of the soybean meal. Thus, food costs are lowered in that a portion of the normal food supply is supplanted by converted animal waste products and, also, costly sewage and waste disposal systems are eliminated.

The process also lends itself readily to automation so that a typical confined animal shelter as disclosed in copending application Ser. No. 879,194, filed Nov. 24, 1969 can be managed and maintained by one or two individuals. Thus, one or two individuals can readily care for up to five thousand swine housed in a structure as disclosed in the above-noted copending application utilizing the method of the present invention for converting the animal waste products into a highly nutritious high protein feed supplement.

Accordingly, it is an object of the present invention to provide a method for converting animal waste products into a nutritious and disease-free high protein feed supplement.

A still further object of the present invention is to provide a method to economically dispose of animal waste products produced by animals grown in a confined environment to preclude air and water pollution inherent in the disposal of such wastes.

These and other objects of the present invention will be more readily apparent after consideration of the following specification and drawings.

In the Drawings:

FIGS. 1–3 are graphs of the number of organisms in the treated swine waste slurry as a function of the exposure in minutes of the treated slurry at various elevated temperatures.

In accordance with the preferred embodiment of the present invention, solid and liquid waste material from animals, such as swine, which may be housed in a confined environment, is collected in a processing vessel or drum. The drum is equipped with means to aerate and agitate the contents. Suitable equipment for carrying out the present invention is set forth in detail in copending application Ser. No. 100,587. A quantity of water is added to the drum to form a slurry of water and animal waste products and, initially, a culture of pure yeast, for example, *Candida utilis*, is added to initiate the conversion process. In addition, a small quantity of sugar may optionally be added to the slurry in order to generate sufficient starting materials or innoculants for the process. Air is then pumped through the drum by means of an aerator and the slurry is agitated to begin a process which converts the nitrogen in the animal waste product into a high protein product comprising amino acids, apparently by the propagation of the yeast *Candida utilis*. The conversion is very efficient and the high protein content product which is then tapped from the drum can be directly mixed with the animal's grain meal feed as a food supplement. Part of the product may be left in the drum to initiate the fermentation process of the next input of raw animal waste products and water added to the drum.

According to an embodiment of the process of the present invention, a slurry of animal waste was added to a process vat. The slurry of animal waste added to the vat was in the ratio of about 10 lbs. of liquid to 1 lb. of solid waste material. The liquid included about 4 pounds of the liquid waste product of the swine and about 6 pounds of added water. The capacity of the vat was approximately 55 gallons to which 35 gallons of slurry were added. To initially start the fermentation process at the beginning of a cycle, one-half pint of cultured pure *Candida utilis* yeast and one-half pint of Bakers yeast, in aqueous solution of about 25 percent dry yeast, and 5 pounds of sugar were added to the vat. An air compressor was operated at about its capacity to supply air at standard pressures and temperatures at the rate of 100 liters per minute to the vat. The agitating system paddle was operated at about 50 rpm in order to effectively break up solid particles in the slurry and to maintain them dispersed throughout the vat. In larger units the speed would be less to obtain a comparable tip speed of the agitator. Additionally, the high speed rotation of the agitating system breaks up the airstream emitted from the air access openings into smaller more diffuse bubblets of air which are readily dispersed within the solution. The solution was then maintained at a temperature of about 90°F plus or minus five degrees, for example, by a heating unit controlled by a temperature responsive heating element, and the pH of the solution was periodically checked. Suitable temperatures may be from about 75°F up to almost 100°F, preferably 85°–95°F. For an efficient conversion of the animal waste products into a useful product according to the process of the present invention, it has been found that a pH between 4.5 and 5 is most effective to provide the best possible environment for growth of the yeast culture while retarding the growth of bacteria. The pH range may however be from about 4 up to almost 7. Accordingly, dependent upon the pH reading, phosphoric acid is periodically added when necessary in order to maintain the pH of the solution in the preferred range between 4.5 and 5.

Although compressed atmospheric air is supplied to the vat, it is to be understood that it is the oxygen in the air which reacts to assist in the conversion of the animal waste products into a yeast product. The more oxygen that can be supplied rapidly to the mixture in the vat the more rapid the conversion. Thus, it is important to supply oxygen to the mixture and retain the oxygen in solution to permit the conversion of the waste products into a useful product. Rotating paddles break up the airstream into fine bubblets of air which are more readily dispersed throughout the mixture and which create a greater surface area of contact between the oxygen in the air bubblets and the waste products in solution. These bubbles stay in solution longer because of the swirling action created by the paddle.

The process of this invention results in the generation of a considerable amount of heat and carbon dioxide. Therefore, depending on ambient conditions, the heating unit referred to above may not be necessary during many moderate months of the year to maintain the desired operating temperatures.

In this environment, it has been found that a metabolic process occurs whereby animal waste products are aerobically converted to a useful product to a highly significant degree.

It is to be understood that the high protein feed supplement can be produced by a batch process, i.e., no input or takeout until complete conversion, or on a continuous run basis wherein part of the product is removed and raw animal waste added at periodical intervals. In an embodiment of the invention according to the procedure outlined above, after an initial process period of three days, about 2½ gallons of the fermented slurry product were removed for each of two daily feedings of swine and about 2½ gallons of a slurry of swine waste products were added immediately thereafter. The slurry of waste products was substantially that described above and averaged about 10–13 percent solids by weight. It was found that the 2½ gallons of newly added animal waste products were fully assimilated in the 55-gallon mixing vat and sufficiently processed so that within 12 hours, the interval between feedings, about 2½ gallons of feed supplement which averaged about 10–13 percent solids by weight, were removed from the vat. The product removed from the vat was completely and directly used as a feed supplement as described below.

In a procedure utilizing five test pigs, individually penned, each was fed a diet of corn and soybean meal supplemented with the high protein product resulting from processing the animal waste products in the manner discussed above. The animal waste products for this procedure were obtained from these pigs. Each pig produced about 1 pound of solid waste and about four times this amount of liquid waste to which the additional water was added. This waste was used to produce almost an equal amount of feed supplement by the above described process. Further details on this procedure are set forth in copending patent application Ser. No. 100,587.

In an embodiment of this invention the slurry of animal waste products treated in accordance with the procedure described above, was further processed in a separate vat at an elevated temperature. This further treatment is in part a sterilization procedure to reduce the enteric flora and *E. coli* content of the treated slurry and to improve the digestibility of the product. Live yeasts and other cultured organisms are known to be less digestible than when killed and their cell walls burst because of their tough outer cell walls. This process makes the internal cellular protoplasm available for digestion without need to first break down or digest the tough cell wall.

Three groups of samples were taken from this slurry and heated to 140°, 160°, and 180°F, respectively. Samples were removed after exposure times of 1, 5, 10, 20, and 30 minutes. Thermal death curves were plotted for the enteric flora for each of the three exposure temperatures. These curves are presented in FIGS. 1 through 3. As shown, there was a sharp decrease in the population of *E. coli* and enteric flora within the first 5 minutes of exposure of each of the three temperatures. During this time interval a portion of the protein apparently is coagulated, which might account for the sharp reduction in the slope of the curve at 140°F, after this initial exposure time. The initial coagulated protein forms a protective coating which enables the organism to survive some of the remaining heat treatment.

Substantial numbers of enteric flora survived a temperature of 160°F for 30 minutes. However, the *E. coli* within the process tank samples did not survive beyond 10 minutes of exposure to 160°F.

The enteric flora and *E. coli* were sharply reduced after 5 minutes of exposure to 180°F. No *E. coli* were found to survive following the 10 minutes of exposure and all of the enteric flora were found to have been effectively killed following 30 minutes of heat treatment at 180°F. From these curves it is determined that sufficient control of *E. coli* and the common enteric flora is preferably carried out by heating the process tank fluids to a temperature of 160°F for 20 minutes or 180°F for 10 minutes. To eliminate all enteric flora a temperature of 180°F for 30 minutes is suitable.

The present invention is preferably carried out by heat treating a swine waste conversion product produced according to the process set forth in copending patent application Ser. No. 100,587.

Alternatively the swine waste conversion product may be made by the process set forth in copending patent application Ser. No. 170,974, by B. G. Harmon. In either case, a swine waste is aerobically treated at an elevated temperature to produce a swine feed supplement. The period of this initial treatment is sufficient to enhance the amino acid and protein content of the waste and to substantially eliminate urea therefrom, as explained in greater detail in the above referenced copending applications. The feed supplement is then subjected to a temperature of at least 140°F for at least five minutes. As the temperature is increased the inactivation of enteric flora increases, with all common organisms destroyed at about 180°F in about 30 minutes. As the temperature is increased further, for example 200°F, the time required for treatment to achieve comparable results is reduced. Even higher temperatures can also be employed to further reduce the heat treating time in conjunction with an elevated pressure in a conventional type of pressure-cooking apparatus. Another alternative is to pressurize a vat containing the treated slurry and then to quickly release the pressure. The sharp pressure reduction will assist in bursting the cell walls and destroying the living organisms, and as referred to above, this improves the digestibility and sterilization of the product. This procedure may be carried out in conventional equipment for this purpose and the pressurization and depressurization may be carried out with steam or other materials.

Thus, it is seen that in addition to providing a method for disposing of animal waste products in a clean and efficient manner so as to obviate any polluting effects of animal waste disposal, the present invention also provides a method and apparatus for converting animal waste products into a nutritious high protein feed supplement which shows a marked ability to provide nutritional value for swine and eliminate potential disease causing microorganisms. Although this invention has been illustrated by the conversion of swine wastes, other animal wastes may be used and the products produced may be fed to swine or other domestic animals, for example, nonruminating animals.

I claim:

1. A method of increasing the weight of a group of swine which comprises:
    forming a slurry of solid and liquid waste products of said swine and a yeast,
    aerating and agitating said slurry while maintaining its temperature at about 75° to 95°F and its pH at about 4 to 7 until the urea content of the slurry has been substantially eliminated, thereby producing a slurry useful as a swine feed supplement
    heating said slurry at a temperature between about 140° – 200°F for a period of time to inactivate a substantial portion of enteric flora therein and to improve the digestability of said supplement, and
    feeding said swine feed supplement to said swine.

2. The process of claim 1 wherein said heating is continued for a period for at least 5 minutes at a temperature of at least 140°F.

3. The method of forming a swine feed supplement which comprises:
    forming a slurry of solid and liquid waste products of said swine and a yeast,
    aerating and agitating said slurry while maintaining its temperature at about 75° to 95°F and its pH at about 4 to 7 until the urea content of the slurry has been substantially eliminated, thereby producing a slurry useful as a swine feed supplement and
    heating said slurry at a temperature between about 140° – 200°F for a period of time to inactivate a substantial portion of enteric flora therein and to improve the digestability of said supplement.

4. The method of claim 3 which comprises heating said slurry at least at about 160°F for up to about 20 minutes to substantially inactivate all *E. coli* in the slurry.

5. The method of claim 3 which comprises heating said slurry at least at about 180°F for up to about 30 minutes to substantially inactivate all common enteric flora in the slurry.

6. The method of claim 3 wherein conventional swine rations comprising corn and soy bean meal are added to said swine feed supplement.

* * * * *